(12) United States Patent
Kim et al.

(10) Patent No.: US 9,874,999 B2
(45) Date of Patent: Jan. 23, 2018

(54) MOBILE TERMINAL AND METHOD FOR OPERATING SAME

(71) Applicant: LG ELECTRONICS INC., Seoul (KR)

(72) Inventors: Jaewoon Kim, Seoul (KR); Bojung Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 265 days.

(21) Appl. No.: 14/763,134

(22) PCT Filed: Feb. 7, 2013

(86) PCT No.: PCT/KR2013/000988
§ 371 (c)(1),
(2) Date: Jul. 23, 2015

(87) PCT Pub. No.: WO2014/123261
PCT Pub. Date: Aug. 14, 2014

(65) Prior Publication Data
US 2015/0355792 A1      Dec. 10, 2015

(51) Int. Cl.
| | | |
|---|---|---|
| *G06F 3/0482* | (2013.01) | |
| *G06F 3/01* | (2006.01) | |
| *G06F 3/0484* | (2013.01) | |
| *G06F 3/0488* | (2013.01) | |
| *G06F 1/16* | (2006.01) | |
| *G06F 3/0485* | (2013.01) | |
| *G06F 3/0486* | (2013.01) | |

(52) U.S. Cl.
CPC .......... *G06F 3/0482* (2013.01); *G06F 1/1694* (2013.01); *G06F 3/017* (2013.01); *G06F 3/0485* (2013.01); *G06F 3/0486* (2013.01); *G06F 3/0488* (2013.01); *G06F 3/04842* (2013.01); *G06F 3/04883* (2013.01); *G06F 2200/1637* (2013.01)

(58) Field of Classification Search
CPC ...... G06F 3/017; G06F 3/0346; G06F 3/0485; G06F 3/0208; G06F 3/0488; G06F 3/0484; G06F 3/0481; G06F 2200/1637; G06F 1/162; G06F 3/0416
USPC ....... 715/783–788, 792, 799, 800, 798, 815, 715/814, 830, 863
See application file for complete search history.

(56) References Cited

U.S. PATENT DOCUMENTS 8,539,375 B1 * 9/2013 Thorsander ........... G06F 3/0482 345/173
9,442,517 B2 * 9/2016 Croughwell, III .... G06F 1/1626
(Continued)

FOREIGN PATENT DOCUMENTS

KR   10-2010-0030273 A   3/2010
KR   10-2010-0077982 A   7/2010
(Continued)

*Primary Examiner* — Tadeese Hailu
(74) *Attorney, Agent, or Firm* — Birch, Stewart, Kolasch & Birch, LLP (57) ABSTRACT

A method for operating a mobile terminal according to one embodiment of the present invention comprises the steps of: displaying an object list through a display portion; receiving a selection of a specific object form the displayed object list; receiving an input of a tilting gesture for moving the position of the selected specific object; and moving the position of the selected specific object according to the tilting gesture.

12 Claims, 10 Drawing Sheets

(56) References Cited

U.S. PATENT DOCUMENTS

| | | | | |
|---|---|---|---|---|
| 2009/0153289 A1* | 6/2009 | Hope | ................... | G06F 3/04883 |
| | | | | 340/5.1 |
| 2010/0060475 A1 | 3/2010 | Choi | | |
| 2010/0167788 A1 | 7/2010 | Choi | | |
| 2011/0053641 A1* | 3/2011 | Lee | ....................... | G06F 1/1626 |
| | | | | 455/556.1 |
| 2011/0115817 A1* | 5/2011 | Chun | ................... | G06F 3/04817 |
| | | | | 345/629 |
| 2012/0013553 A1 | 1/2012 | Kim et al. | | |
| 2012/0249595 A1* | 10/2012 | Feinstein | .............. | G06F 1/1694 |
| | | | | 345/642 |
| 2013/0154975 A1* | 6/2013 | Han | ....................... | G06F 3/041 |
| | | | | 345/173 |

FOREIGN PATENT DOCUMENTS

| | | |
|---|---|---|
| KR | 10-2011-0044391 A | 4/2011 |
| KR | 10-2011-0127854 A | 11/2011 |
| KR | 10-2012-0001941 A | 1/2012 |
| KR | 10-2012-0008156 A | 1/2012 |

\* cited by examiner

MOBILE TERMINAL AND METHOD FOR OPERATING SAME

TECHNICAL FIELD

The present disclosure relates to a mobile terminal and a method for operating the same.

BACKGROUND ART

Terminals may be classified into mobile/portable terminals and stationary terminals depending on the mobility. The mobile terminals may be further classified into handheld terminals and vehicle mount terminals depending on direct portability by a user.

As the functions of the terminals are diversified, the terminals are being implemented as multimedia players having complex functions including taking pictures, recording video, playing music or video files, gaming or receiving the broadcasting.

As such, since the terminals are implemented as multimedia players, users need to move a selected object to a desired place after the selection of an object such as a video file or music file.

Typically, when scrolling is used in order to move the selected object, moving the object on a short page is effective but when there is a need to move the object on a long page, there is a limitation in that users have inconvenience because it is difficult to quickly move and it is difficult to control.

SUMMARY OF THE INVENTION

Embodiments provide a mobile terminal that may easily move the position of an object according to the tilting operation of the mobile terminal, and a method for operating the same.

In one embodiment, an operating method of a mobile terminal includes displaying an object list through a display unit, receiving a selection of a specific object in the displayed object list, receiving an input of a tilting gesture for moving a position of the selected specific object, and moving the position of the selected specific object according to the tilting gesture.

In another embodiment, mobile terminal includes a display unit, and a control unit displaying an object list through the display unit, receiving a selection of the specific object in the displayed object list, receiving an input of a tilting gesture for moving a position of the selected specific object, and moving a position of the selected specific object according to the tilting gesture.

According to various embodiments, a user may adjust the tilting degree of a mobile terminal to easily move the position of an object to a place where the user wants.

In particular, when there is a need to move the position of an object to a long page, user convenience may be greatly enhanced because it is possible to quickly and effectively move the object only with the tilting operation of the mobile terminal.

DETAILED DESCRIPTION OF THE EMBODIMENTS OF THE INVENTION

A mobile terminal related to an embodiment is described in detail with reference to the accompanying drawings. Since the suffixes "module" and "unit" for components used in the following description are given and interchanged for easiness in making the present disclosure, they do not have distinct meanings or functions.

Mobile terminals described in the present disclosure may include cellular phones, smart phones, laptop computers, digital broadcasting terminals, personal digital assistants (PDAs), portable multimedia players (PMPs), and navigation devices. However, a person skilled in the art may easily appreciate that a configuration according to an embodiment described herein may be applied not only to the mobile terminal but also to a fixed terminal, such as a digital TV, desktop computer, and so on, except when it is possible to apply to the mobile terminal only.

A structure of a mobile terminal according to an embodiment is described below with reference to FIG. 1.

Figure 1:
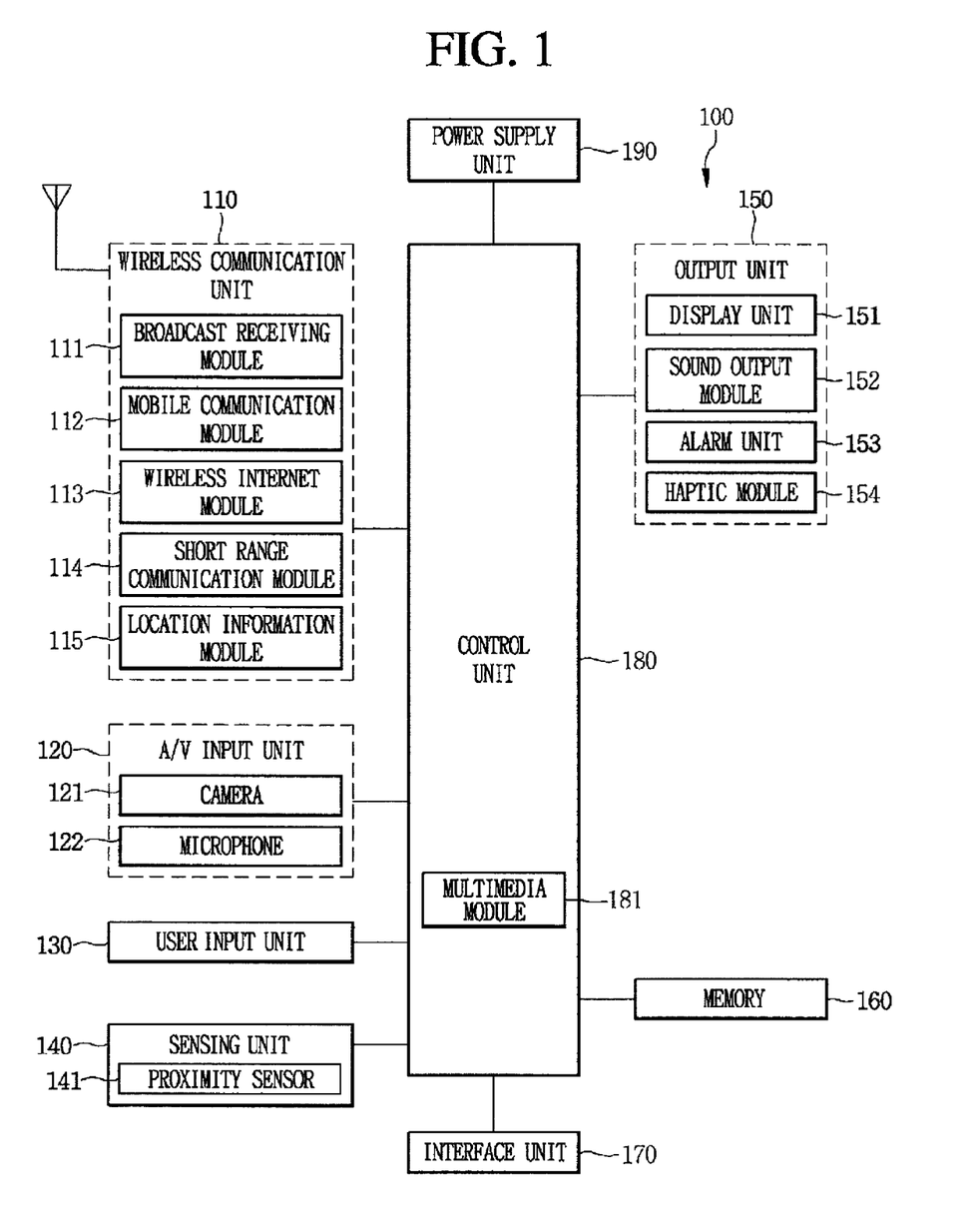
FIG. 1 is a block diagram of a mobile terminal according to an embodiment.

FIG. 1 is a block diagram of a mobile terminal according to an embodiment.

A mobile terminal 100 may include a wireless communication unit 110, an audio/video (AV) input unit 120, a user input unit 130, a sensing unit 140, an output unit 150, a memory 160, an interface unit 170, a control unit 180, and a power supply unit 190. Since the components shown in FIG. 1 are not essential, a mobile terminal having more or less components than those may also be implemented.

In the following, the components above are discussed one by one.

The wireless communication unit 110 may include one or more modules that enable wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless internet module 113, a short range communication module 114, and a position information module 115.

The broadcast receiving module 111 receives a broadcast signal and/or broadcast related information from an external broadcast management server through a broadcast channel.

The broadcast channel may include a satellite channel or a terrestrial channel. The broadcast management server may indicate a server that generates and transmits a broadcast signal and/or broadcast related information, or a server that receives a pre-generated broadcast signal and/or broadcast related information and transmits them to a terminal. The broadcast signal may also include a broadcast signal formed by combining a TV broadcast signal or a radio broadcast signal with a data broadcast signal, in addition to the TV broadcast signal, the radio broadcast signal, and the data broadcast signal.

The broadcast related information may mean information on a broadcast channel, a broadcast program or a broadcast service provider. The broadcast related information may also be provided through a mobile communication network. In this case, the information may be received by the mobile communication module 112.

The broadcast related information may exist in various forms. For example, it may exist in the form of an electronic program guide (EPG) of digital multimedia broadcasting (DMB) or an electronic service guide (ESG) of digital video broadcast-handheld (DVB-H).

The broadcast receiving module 111 may receive a digital broadcast signal by using a digital broadcasting system such as a digital multimedia broadcasting-terrestrial (DMB-T) broadcasting system, a digital multimedia broadcasting-satellite (DMB-S) broadcasting system, a media forward link only (MediaFLO) broadcasting system, a digital video broadcast-handheld (DVB-H) broadcasting system, or an integrated services digital broadcast-terrestrial (ISDB-T) broadcasting system. The broadcast receiving module 111 may also be configured to be suitable for other broadcasting systems in addition to the above-described digital broadcasting systems.

A broadcast signal and/or broadcast related information received through the broadcast receiving module 111 may be stored in the memory 160.

The mobile communication module 112 transmits and receives a wireless signal to and from at least one of a base station, an external terminal and a server on a mobile communication network. The wireless signal may include various types of data depending on the transmission and reception of a voice call signal, a video call signal or a text/multimedia message.

The wireless internet module 113 indicates a module for a wireless internet connection and may be built in or provided separately from the mobile terminal 100. As a wireless internet technology, wireless LAN (WLAN, Wi-Fi), wireless broadband (Wibro), world interoperability for microwave access (Wimax), high speed downlink packet access (HSDPA) or the like may be used.

The short range communication module 114 indicates a module for short range communication. As the short range communication technology, Bluetooth, radio frequency identification (REID), infrared data association (IrDA), ultra wideband (UWB), ZigBee may be used.

The position information module 115 is a module for obtaining the position of a mobile terminal and includes a global position system (GPS) module as a typical example.

Referring to FIG. 1, the AV input unit 120 is used for an audio signal or video signal input and may include a camera 121 and a microphone 122. The camera 121 processes a picture frame of a still image or a video obtained by an image sensor in a video call mode or in an imaging mode. The processed picture frame may be displayed on the display unit 151.

The image frame processed by the camera 121 may be stored in the memory 160 or externally transmitted through the wireless communication unit 110. The camera 121 may be arranged in plurality depending on the usage environment.

The microphone 122 receives an external sound signal in a call mode, a recording mode, or a voice recognition mode and processes the signal into electrical voice data. In the call mode, the voice data obtained through the processing may be converted into a format that enables transmission to a mobile communication base station through the mobile communication module 112, and the data obtained through conversion may be output to the mobile communication base station. Various noise removing algorithms for removing noise generated in the process of receiving an external sound signal may be implemented in the microphone 122.

The user input unit 130 generates input data for the operation control of a user terminal. The user input unit 130 may include a key pad, a dome switch, a (static pressure/capacitive) touch pad, a jog wheel, and a jog switch.

The sensing unit 140 senses the current states of the mobile terminal 100 such as an open/close state of the mobile terminal 100, a position of the mobile terminal 100, whether a user touches the mobile terminal 100, an orientation of the mobile terminal, and acceleration/deceleration of the mobile terminal and generates a sensing signal for controlling the operation of the mobile terminal 100. For example, when the mobile terminal 100 is of a slide phone type, it is possible to sense whether a slide phone is open or close. Moreover, it is also possible to sense whether power is supplied by the power supply unit 190 or whether the interface unit 170 is coupled to an external device. The sensing unit 140 may include a proximity sensor 141.

The output unit 150 is used for generating a visual, auditory or tactile output and may include the display unit 151, a sound output module 152, an alarm unit 153, and a haptic module 154.

The display unit 151 displays (outputs) information processed by the mobile terminal 100. For example, when the mobile terminal is in the call mode, the display unit 151 displays user interface (UI) or graphic user interface (GUI) related to a call. When the mobile terminal 100 is in a video call mode or in an imaging mode, the display unit 151 displays an imaged and/or received image, the UI, or the GUI.

The display unit 151 may include at least one of a liquid crystal display (LCD), a thin film transistor-liquid crystal display (TFT LCD), an organic light-emitting diode (OLED), a flexible display, and a 3D display.

Some of the displays may be configured as transparent or optically transferable to enable viewing of the outside therethrough. The displays may be referred to as transparent displays which include a transparent OLED (TOLED) as a typical example. The back structure of the display unit 151 may also be configured as optically transferable. Due to such a structure, a user may see objects located at the back side of a terminal body through a region which the display unit 151 of the terminal body occupies.

Depending on the implementation of the mobile terminal 100, the display unit 151 may exist in plurality. For example, a plurality of display units may be arranged on one surface of the mobile terminal 100 to be spaced apart from one another or integrally or may also be respectively arranged on different surfaces thereof.

When the display unit 151 and a sensor sensing a touch operation (hereinafter, referred to as a 'touch sensor') form a mutually layered structure (hereinafter, referred to as a 'touch screen'), the display unit 151 may also be used as an input device in addition to the output device. The touch sensor may be in the form of e.g., a touch film, touch sheet, or touch pad.

The touch sensor may be configured to convert, a change in pressure applied to a specific portion of the display unit 151 or in capacitance generated at a specific portion of the display unit 151, into an electrical input signal. The touch sensor may be configured to be able to detect pressure of touch in addition to position and area of the tough.

When there is a touch input to the touch sensor, a corresponding signal(s) is transmitted to a touch controller. The touch controller processes the signal(s) and then transmits corresponding data to the control unit 180. Accordingly, the control unit 180 may be aware of a touched region of the display unit 151.

Referring to FIG. 1, the proximity sensor 141 may be arranged in the internal region of the mobile terminal, surrounded by the touch screen, or near the touch screen. The proximity sensor 141 indicates a sensor that detects the absence and presence of an object approaching a certain detection face or an object near the proximity sensor without mechanical contact by using the force of an electromagnetic field or an infrared ray. The proximity sensor 141 has a longer lifetime than a contact sensor and also has a wide application.

Examples of the proximity sensor 141 include a transmissive photoelectric sensor, a direct reflective photoelectric sensor, a mirror reflective photoelectric sensor, a high-frequency oscillating proximity sensor, a capacitive proximity sensor, a magnetic proximity sensor, and an infrared proximity sensor. When the touch screen is of a capacitive type, it is configured to detect the proximity of a pointer by using a change in electric field due to the proximity of the pointer. In this case, the touch screen (touch sensor) may be classified as a proximity sensor.

For the convenience of description, an action of recognizing that the pointer approaches the touch screen and is located on the touch screen without a contact is referred to as a "proximity touch" and an action made when the pointer is in actual contact with the touch screen is referred to as a "contact touch". The position where the proximity touch is made with the pointer over the touch screen means the position where the pointer is perpendicular to the touch screen when the pointer makes the proximity touch.

The proximity sensor senses the proximity touch and proximity touch patterns (e.g., a proximity touch distance, a proximity touch direction, a proximity touch speed, a proximity touch time, a proximity touch position, and a proximity touch moving state). Information corresponding to the sensed proximity touch operation and proximity touch patterns may be displayed on the touch screen.

The sound output module 152 may output audio data received from the wireless communication unit 110 or stored in the memory 160 in a call signal receiving mode, a call mode, a recording mode, a voice recognition mode, and a broadcast receiving mode. The sound output module 152 also outputs a sound signal related to a function that is performed by the mobile terminal 100 (e.g., a call signal incoming tone and a message incoming tone). The sound output module 152 may include a receiver, a speaker, a buzzer or the like.

The alarm unit 153 outputs a signal for indicating generation of an event of the mobile terminal 100. Examples of an event generated by the mobile terminal include call signal reception, message reception, a key signal input and a touch input. The alarm unit 153 may also output signals in forms different from a video signal or audio signal, for example, a signal for indicating generation of an event through vibration. The video signal or audio signal may also be output through the display unit 151 or the voice output module 152 and thus the components 151 and 152 may be classified as portions of the alarm unit 153.

The haptic module 154 generates various tactile effects that a user may feel. A typical example of a tactile effect generated by the haptic module 154 is vibration. It is possible to control the intensity and patterns of the vibration generated by the haptic module 154. For example, different vibrations may be synthesized and output or may be sequentially output.

In addition to the vibration, the haptic module 154 may generate various tactile effects such as an effect of stimulus due to a pin arrangement making a motion perpendicular to a contact skin surface, an effect of stimulus due to a jet force or suction force of air through a jet hole or a suction hole, an effect of stimulus due to rubbing a skin surface, an effect of stimulus due to an electrode contact, an effect of stimulus due to an electrostatic force, and an effect due to a reproduction of cold and warmth using a device capable of absorbing or radiating heat.

The haptic module 154 may not only transmit tactile effects through direct contact but may also enable the user to feel tactile effects through a kinesthetic sense of the user's fingers or arms. Depending on the configuration of the mobile terminal 100, the haptic module 154 may exist in plurality.

The memory 160 may store programs for the operation of the control unit 180 and temporarily store data (e.g., a phone book, a message, a still image, and a video) that is input and output. The memory 160 may store data on sound and vibrations in various patterns that are output when there is a touch input on the touch screen.

The memory 160 may include as a storage medium, at least one of a flash memory, a hard disk type memory, a multimedia card micro type memory, a card type memory (for example, a secure digital (SD) or extreme digital (XD) memory), a random access memory (RAM), a static RAM (SRAM), a read-only memory (ROM), an electrically erasable PROM (EEPROM), a programmable ROM (PROM), a magnetic memory, a magnetic disk and an optical disk. The mobile terminal 100 may also operate in relation to a web storage that performs a storage function of the memory 160 over the internet.

The interface unit 170 functions as a path to all external devices connected to the mobile terminal 100. The interface unit 170 receives data from external devices, receives power and transmits the data or power to each component of the mobile terminal 100, or transmits data from the mobile terminal 100 to the external devices. For example, the interface unit 170 may include a wired/wireless headset port, an external charger port, a wired/wireless data port, a memory card port, a port connecting a device that includes an identification module, an audio input and output (I/O) port, an video I/O port, and an earphone port.

The identification module is a chip storing various pieces of information for authenticating authority to use the mobile terminal 100 and may include a user identify module (UIM), a subscriber identity module (SIM), and a universal subscriber identity module (USIM). A device that includes the identification module (hereinafter, referred to as an "identification device") may be manufactured in the form of a smart card. Thus, the identification device may be connected to the terminal 100 via a port.

When the mobile terminal 100 is connect to an external cradle, the interface unit may be a path through which power from the cradle is supplied to the mobile terminal 100 or may be a path through which various command signals input at the cradle by a user are transmitted to the mobile terminal. The power or the various command signals input from the cradle may operate as a signal for recognizing that the mobile terminal is correctly installed in the cradle.

The control unit 180 typically controls the overall operations of the mobile terminal. For example, the control unit 180 performs the control and processing associated with voice calls, data communication, and video calls. The control unit 180 may also include a multimedia module 181 for playing multimedia. The multimedia module 181 may be implemented in the control unit 180, or may be implemented separately from the control unit (180).

The controller 180 may perform pattern recognition processing capable of recognizing a handwritten input or a picture-drawing input performed on the touch screen, as a character and image.

The power supply unit 190 receives internal power or external power under the control of the control unit 180 and provides power required for the operation of each of components.

Various embodiments described herein may be implemented in e.g., a recording medium that may be read with a computer or a similar device by using software, hardware or a combination thereof.

According to a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers), microprocessors, and other electrical units for performing functions. In some cases, the embodiments may be implemented by the control unit 180.

According to software implementation, embodiments such as procedures or functions may be implemented along with a separate software module that performs at least one function or operation. Software codes may be implemented by software applications that are written in proper programming languages. The software codes may be stored in the memory 160 and may be executed by the control unit 180.

In the following, the operating method of a mobile terminal according to an embodiment is described with reference to FIGS. 2 to 10.

Figure 2:
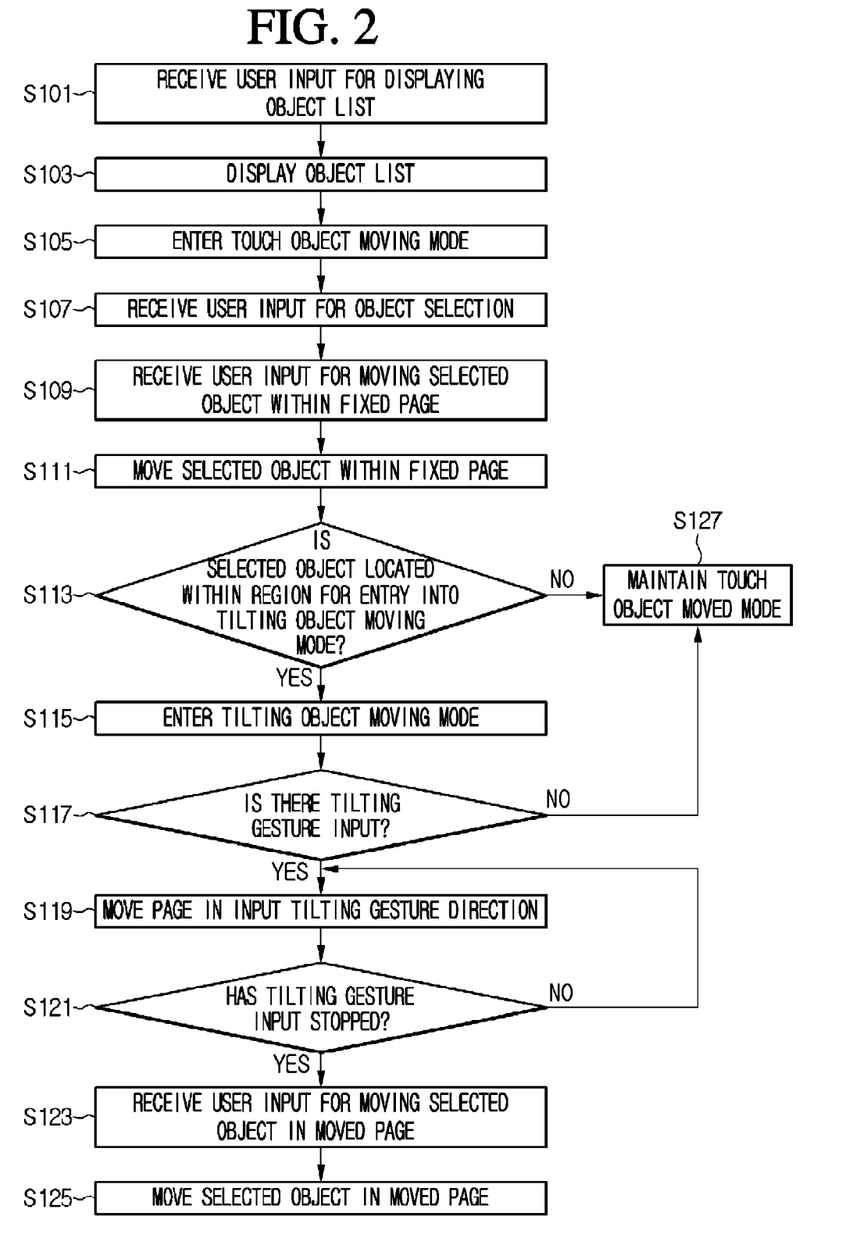
FIG. 2 is a flowchart of an operating method of a mobile terminal according to an embodiment.

FIG. 2 is a flow chart of an operating method of a mobile terminal according to an embodiment.

The control unit 180 receives a user input for displaying an object list in step S101. In an embodiment, the control unit 180 may receive a user input for displaying the object list through a touch sensor. The user input for displaying the object list may be a selection of an application that manages an object. In an embodiment, the object may be an audio file, a video file, a text file or the like but has no need to be limited thereto.

The control unit 180 displays the object list according to the user input for the displaying of the object list in step S103. The object list may include a plurality of objects, which may be displayed on the display unit 151. In this case, when there are too many objects and thus it is difficult to display them in a single page on the display unit 151, the plurality of objects may be displayed through many pages. The single page on the display unit 151 may mean a screen that the display unit 151 currently displays.

The control unit 180 enables the operating mode of the mobile terminal 100 to enter a touch object moving mode in step S105. In an embodiment, the touch object moving mode may be a mode in which an object moves through a user's touch input. In the touch object moving mode, a page may also move according to the movement of the object selected by the user input.

In this example, the movement of the page according to the movement of the object may include the movement of the page while the object list including the plurality of objects discontinuously varies on each page, and the movement of the page while the object list including the plurality of objects continuously varies.

The control unit 180 receives a user input for selecting a single object in the displayed object list in step S107. In an embodiment, the input for an object selection may be a user's long touch at a specific object position in the object list. Related descriptions are provided with reference to FIG. 3.

Figure 3:
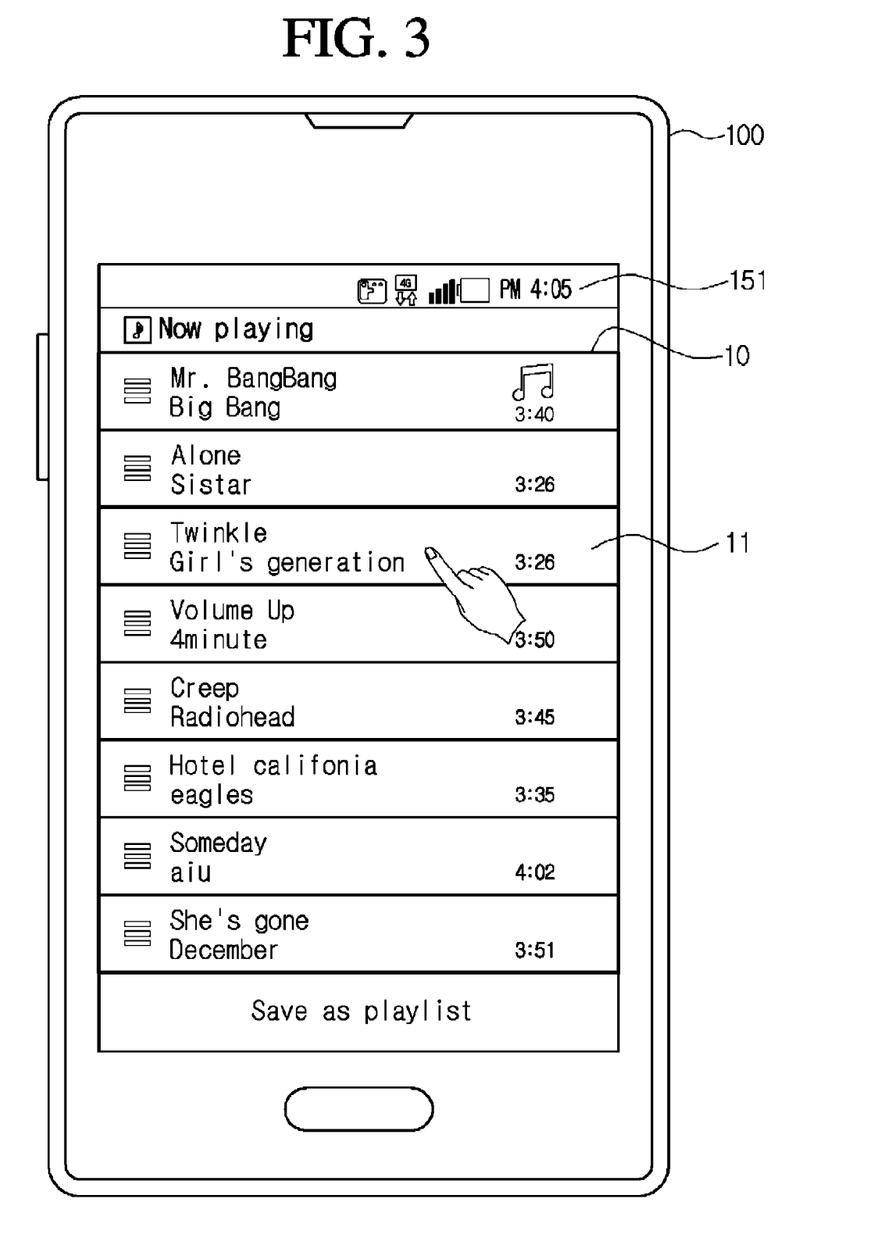
FIG. 3 shows the process of selecting an object according to a user input according to an embodiment.

FIG. 3 shows the process of selecting an object according to a user input according to an embodiment.

Referring to FIG. 3, the object list 10 is displayed on the display unit 151 of the mobile terminal 100. A user may long-touch a specific object 11 in the displayed object list to select it. In this example, a touch time may be two seconds, which are only an example. In an embodiment, the object selected by the long-touch of the specific object 11 by the user may be highlighted by a change in color. However, the inventive concept is not limited thereto and when the object is selected, the mobile terminal 100 may also output sound for indicating that the object has been selected.

Refer back to FIG. 2.

Then, the control unit 180 receives the user input for the movement of the object selected in a fixed page on the display unit 151 in step S109 and moves the selected object according to the user input for the movement of the selected object in step S111. In an embodiment, the user input for the movement of the object may be an input for moving a touch point in a state the selected object is touched. That is, when the touch point at which the touch of the selected object is maintained is moved in a direction in which the user wants to move, the position of the selected object may be moved. Related descriptions are provided with reference to FIG. 4.

Figure 4:
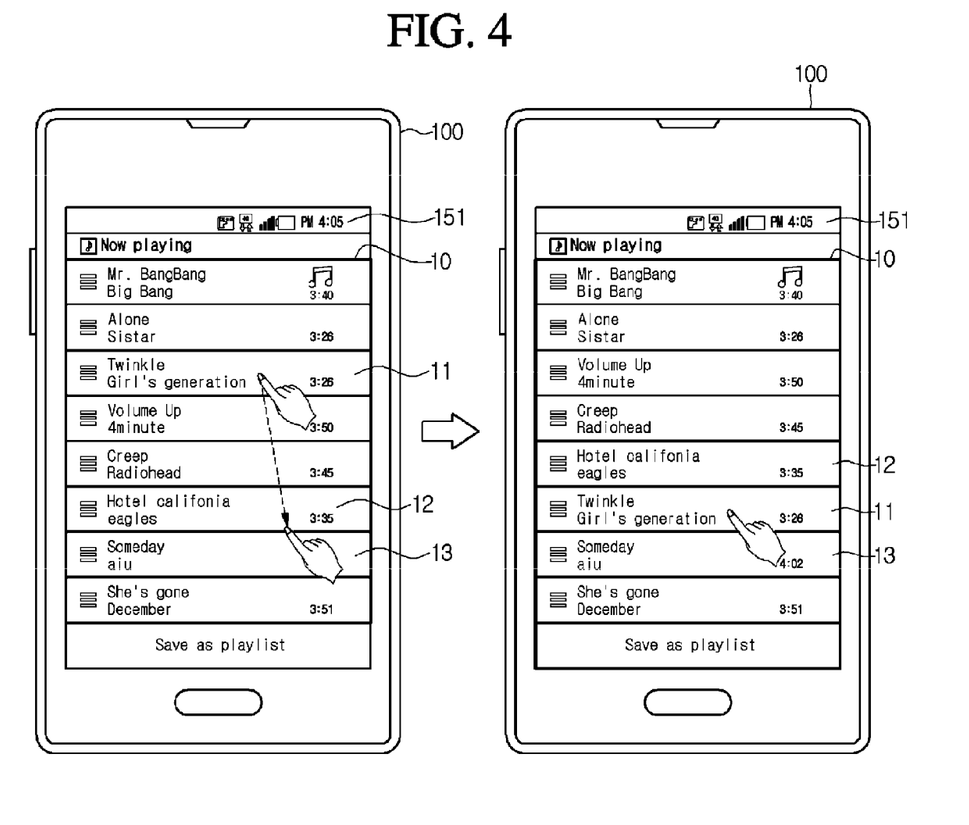
FIG. 4 shows an embodiment in which an object is moved through a user input according to an embodiment.

FIG. 4 shows an embodiment in which an object is moved through a user input according to an embodiment.

As shown in FIG. 4, when the user wants to move the selected object 11 to the position between an object 12 and an object 13, the user moves the touch point on the selected object 11 to the position between the object 12 and the object 13, maintaining the touch of the selected object 11 and then the selected object 11 may be moved to the position between the object 12 and the object 13. The movement position of the touch point for the movement of the selected object 11 to the position between the object 12 and the object 13 does not need to be the boundary line between the object 12 and the object 13 and only needs to be within a certain region including the boundary line between the object 12 and the object 13.

When the user wants to move the position of the object selected in the object list, it is possible to move the object to a desired position only with a simple touch operation and thus user convenience increases.

Refer back to FIG. 2.

The control unit 180 checks whether the object selected on the display unit 151 is located at a tilting operation region for entry into a tilting object moving mode in step S113, and when the selected object is located at the tilting operation region, the control unit 180 enables the operating mode of the mobile terminal 100 to enter the tilting object moving mode in step S115.

In an embodiment, the tilting object moving mode may be a mode in which the selected object moves while the position of a page moves according to the tilting of the mobile terminal 100. In particular, the tilting object moving mode may be a mode in which the moving direction of the position of the page and the moving direction of the selected object vary according to the tilting direction of the mobile terminal 100.

The tilting of the mobile terminal 100 may mean moving the mobile terminal by a certain angle in upper, lower, left and right directions. Related description is provided below.

The tilting operation region is a region for enabling the operating mode of the mobile terminal 100 to enter the tilting object moving mode and when the object selected by the user input moves to be located within a specific region of the display unit 151, the control unit 180 may enable the operating mode of the mobile terminal 100 to enter the tilting object moving mode. In an embodiment, when the object selected by the user input moves to be located within a specific region of the display unit 151, the control unit 180 may enable the operating mode of the mobile terminal 100 to change from a touch object moving mode to the tilting object moving mode or may add the tilting object moving mode, maintaining the touch object moving mode.

In another embodiment, when a touch to an object through a user input is maintained for a certain time, the object is selected and at the same time, the mobile terminal 100 may enter the tiling object moving mode. In this case, although a user does not move the selected object to the tilting operation region, the mobile terminal 100 may operate in the tilting object moving mode.

The control unit 180 checks in step S117 whether a titling gesture has been input through a user input, while the operating mode of the mobile terminal 100 has entered the tilting object moving mode.

If the tilting gesture has been input, the control unit 180 moves the position of the selected object, moving the position of a page on the screen of the display unit 151 according to the direction of the input tilting gesture, in step S119. In an embodiment, the mobile terminal 100 may include a gyro sensor and determine the tilting of the mobile terminal 100 through the gyro sensor.

Steps S113 to S119 are described in detail with reference to FIGS. 5 to 10.

FIGS. 5 to 10 are diagrams for explaining the operation of a mobile terminal according to an embodiment.

Figure 5:
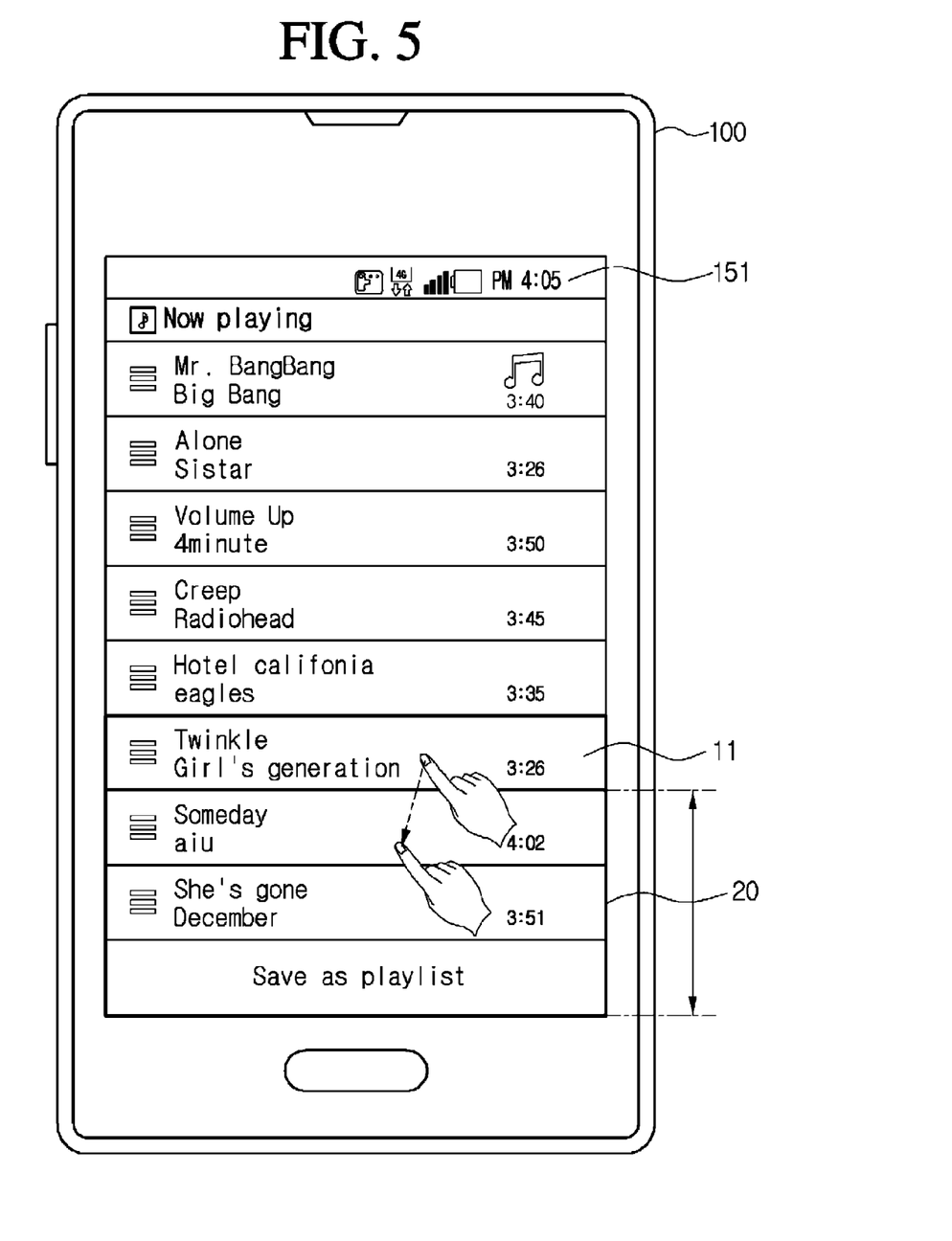
FIGS. 5 to 10 are diagrams for explaining the operation of a mobile terminal according to an embodiment.
Figure 6:
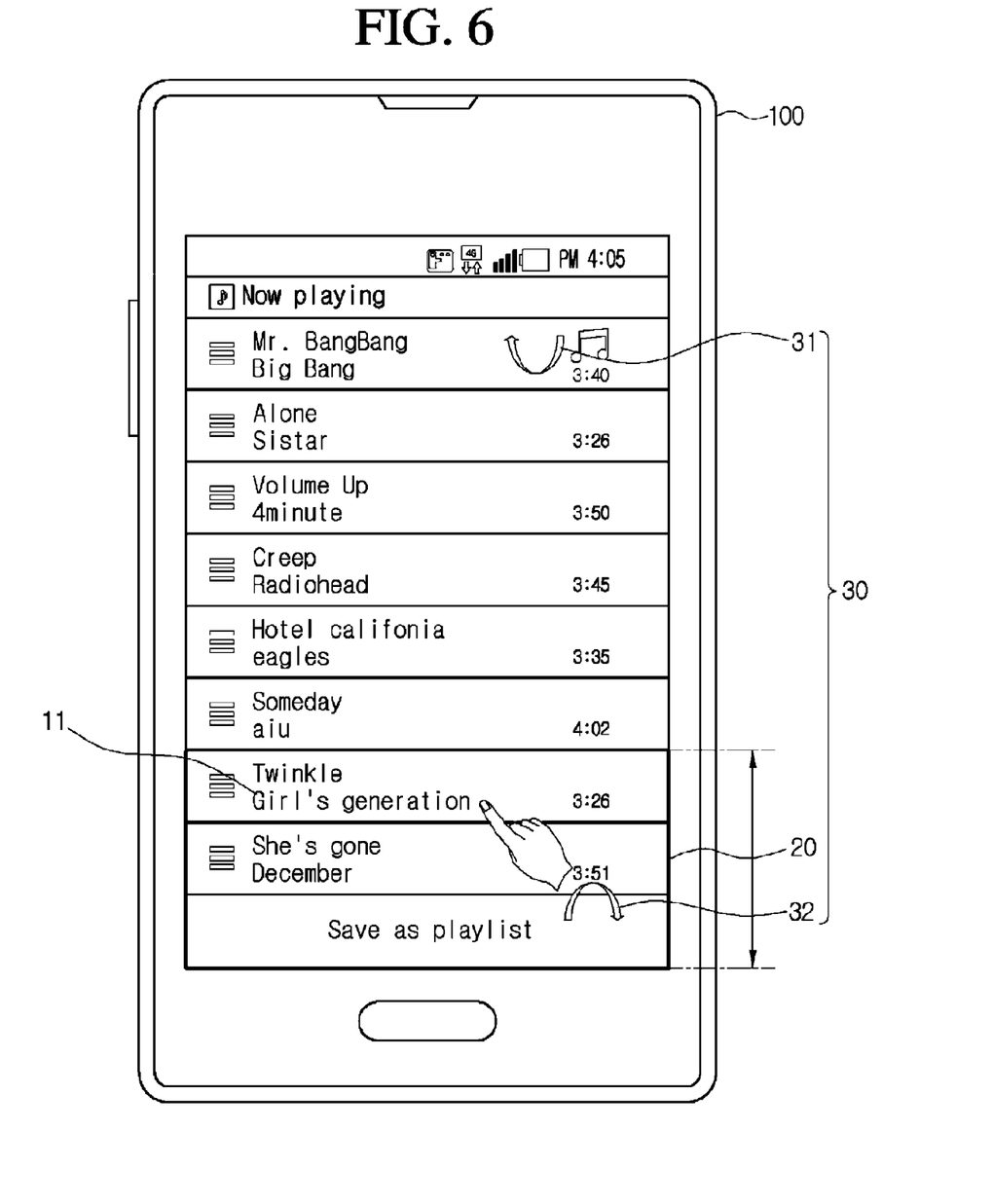

Firstly, FIGS. 5 and 6 show how a mobile terminal enters a tilting object moving mode according to an embodiment.

Referring to FIG. 5, when a user moves the position of the selected object 11 to within the tilting operation region 20, the mobile terminal 100 may operate in the tilting object moving mode. In particular, when the user moves the position of a touch point on the selected object 11 to within the tilting operation region 20, the mobile terminal 100 may operate in the tilting object moving mode.

Although FIG. 5 shows that the tilting operation region 20 is located on the lower portion of the display unit 151, the embodiment is not limited thereto and the tilting operation region may be located in any regions of the display unit 151 such as an upper portion of the display unit 151.

When the selected object 11 moves to within the tilting operation region 20, the display unit 151 may display tilting gesture UIs 31 and 32 on a certain region. A user may visually check that the mobile terminal 100 has entered the object moving mode through the tilting gesture UIs 31 and 32.

The tilting gesture UI 31 may be an UI indicating that the position of the object 11 moves toward the upper portion of a page and the tilting gesture UI 32 may be an UI for indicating that the position of the object 11 moves toward the upper portion of the page. In another embodiment, the tilting gesture UI may be represented by guide text meaning a tilt, unlike FIG. 6.

In another embodiment, when a touch to an object through a user input is maintained for a certain time, the mobile terminal 100 may enter the tilting object moving mode simultaneously with the selection of the object and at the same time, display the tilting gesture UI indicating for the entry into the tilting object moving mode as in FIG. 6.

In another embodiment, the display unit 151 may further include a tilting operation button and when a user touches the tilting operation button, the mobile terminal 100 may enter the tilting object moving mode. The tilting operation button may operate by ON/OFF and when the tilting operation button is once touched, the mobile terminal 100 may enter the tilting object moving mode, in which case when the tilting operation button is touched one more, the tilting object moving mode may be inactivated.

Next, the process of moving the position of the selected object through the tilting gesture input according to an embodiment is described with reference to FIGS. 7 to 10.

Figure 7:
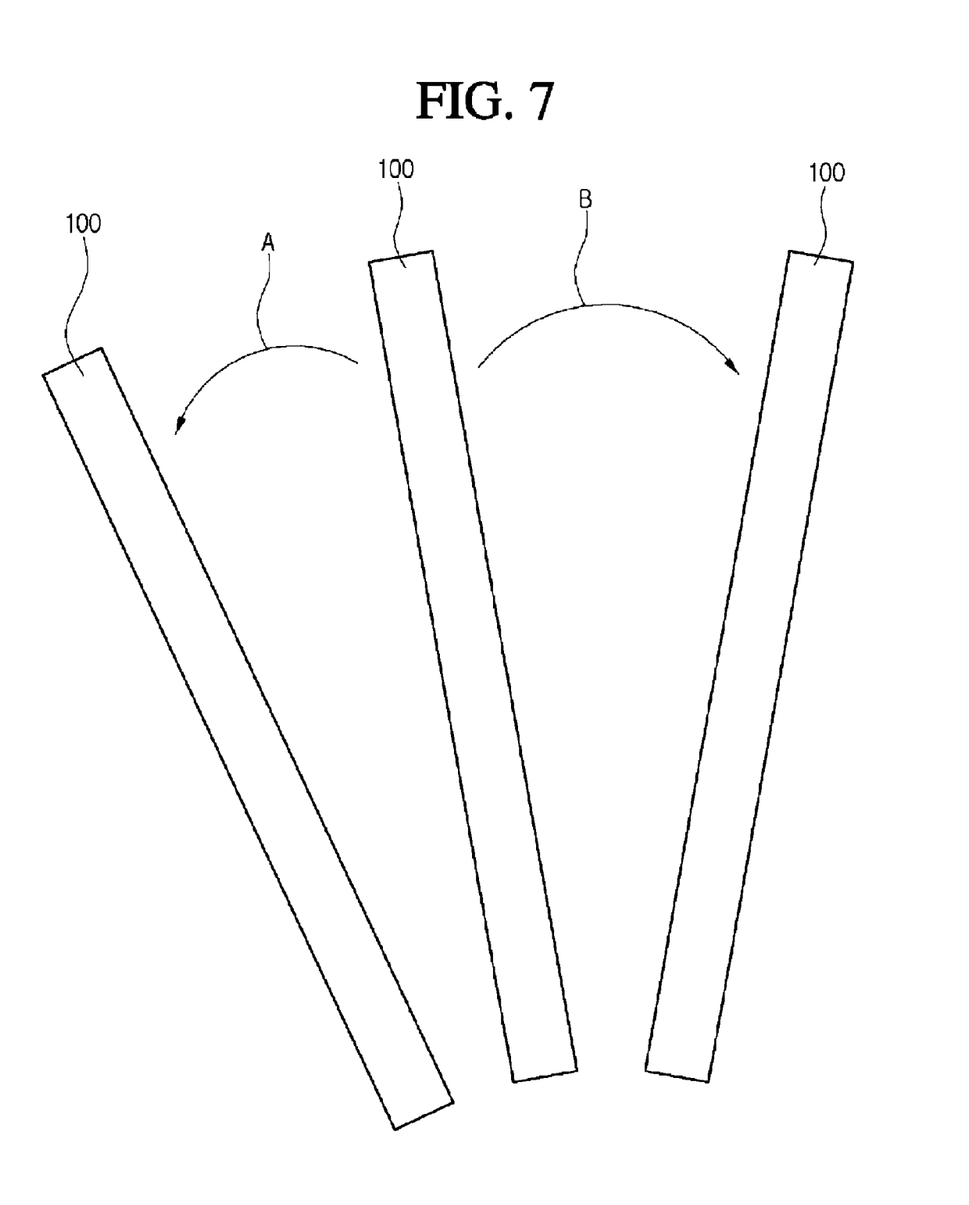

Firstly, FIG. 7 is a diagram for explaining the tilting operation of a mobile terminal according to an embodiment.

Referring to FIG. 7, a lateral face of the mobile terminal 100 is shown. A user may tilt the mobile terminal 100 from its initial position to A or B direction. In particular, the user may move the mobile terminal 100 from its initial position so that it is tilted at an angle in A or B direction. As the mobile terminal 100 is tilted in A or B direction, the position of an object list page varies and thus the position of the selected object 11 may also move. Related descriptions are provided in FIGS. 8 and 9.

Figure 8:
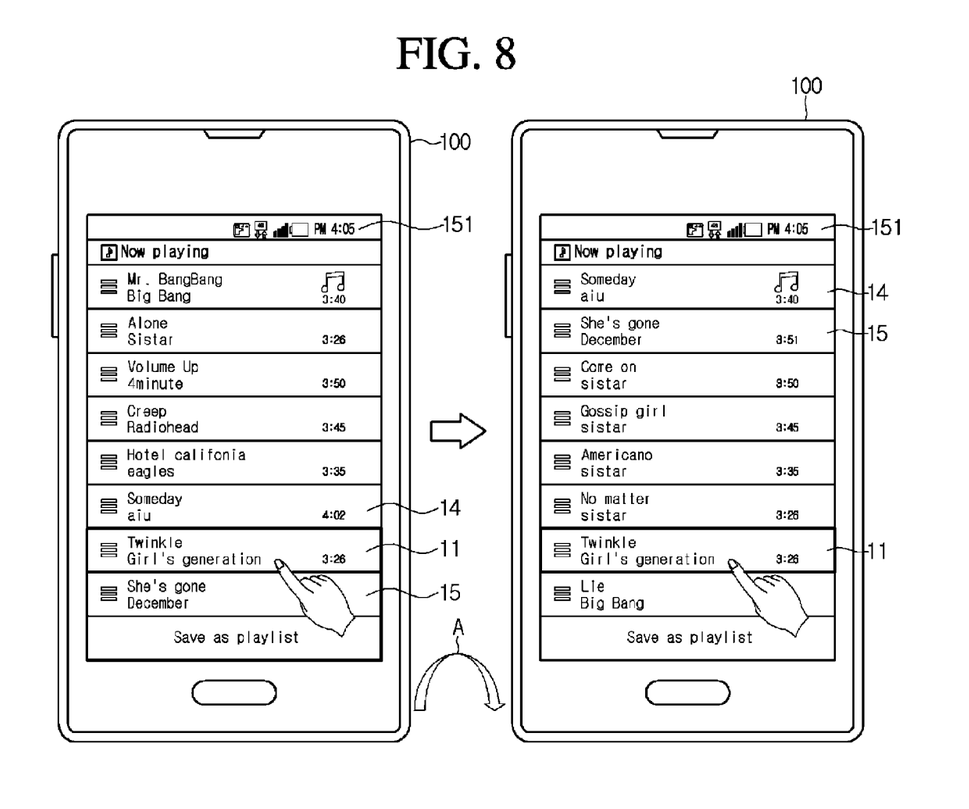
Figure 9:
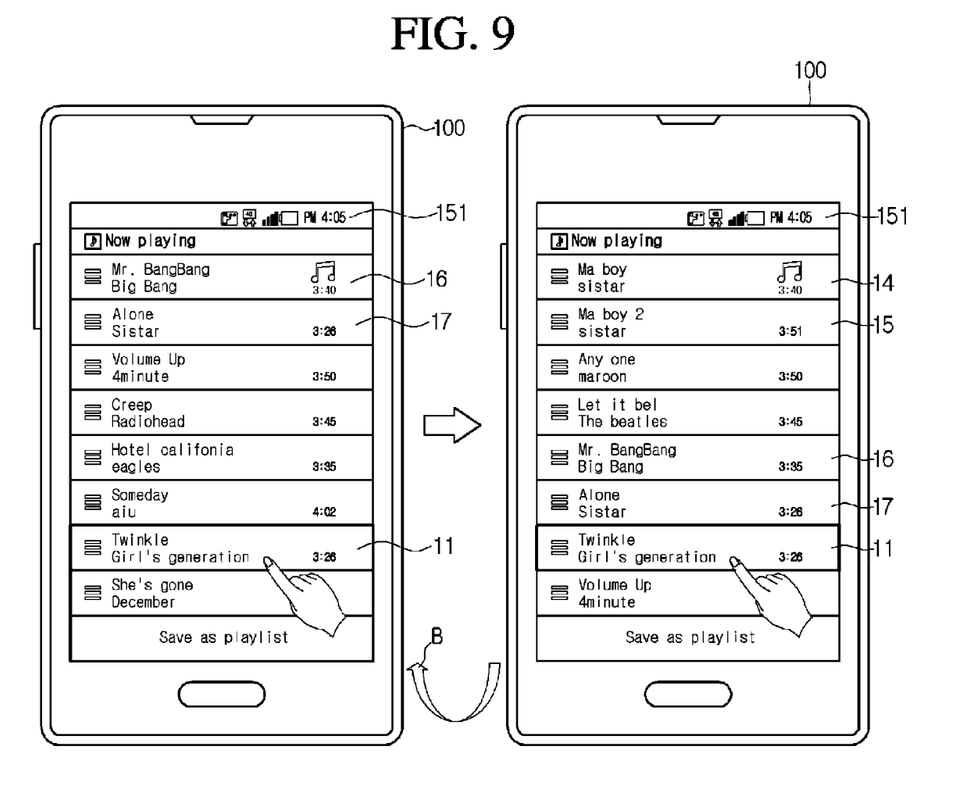

FIGS. 8 and 9 show how the position of an object moves through the tilting of a mobile terminal according to an embodiment.

Referring to FIG. 8, when a user tilts the mobile terminal 100 in the A direction in FIG. 7 in a state in which the mobile terminal 100 operates in a tilting object moving mode, the page position of an object list moves in a lower direction and the selected object 11 may also move in the lower direction. In particular, while the page position of the object list moves in the lower direction, the positions of objects 14 and 15 move to the upper portion of the display unit 151 and the position of the selected object 11 may move to the lower portion of the display unit 151.

Referring to FIG. 9, when the user tilts the mobile terminal 100 in the B direction in FIG. 7 in a state in which the mobile terminal 100 operates in the tilting object moving mode, the page position of the object list moves in an upper direction and the selected object 11 may also move in the upper direction. In particular, while the page position of the object list moves in the upper direction, the positions of objects 14 and 15 move to the lower portion of the display unit 151 and the position of the selected object 11 may move to the upper portion of the display unit 151.

In an embodiment, a speed at which the position of a page displayed on the display unit 151 moves and a speed at which the position of the selected object 11 moving together moves may be adjusted according to the tilting degree of the mobile terminal 100. In particular, the speed at which the page moves and the speed at which the position of the selected object 11 moves may increase the wider the tilting angle of the mobile terminal 100, and the speed at which the page moves and the speed at which the position of the selected object 11 moves may decrease the narrower the tilting angle of the mobile terminal 100.

Figure 10:
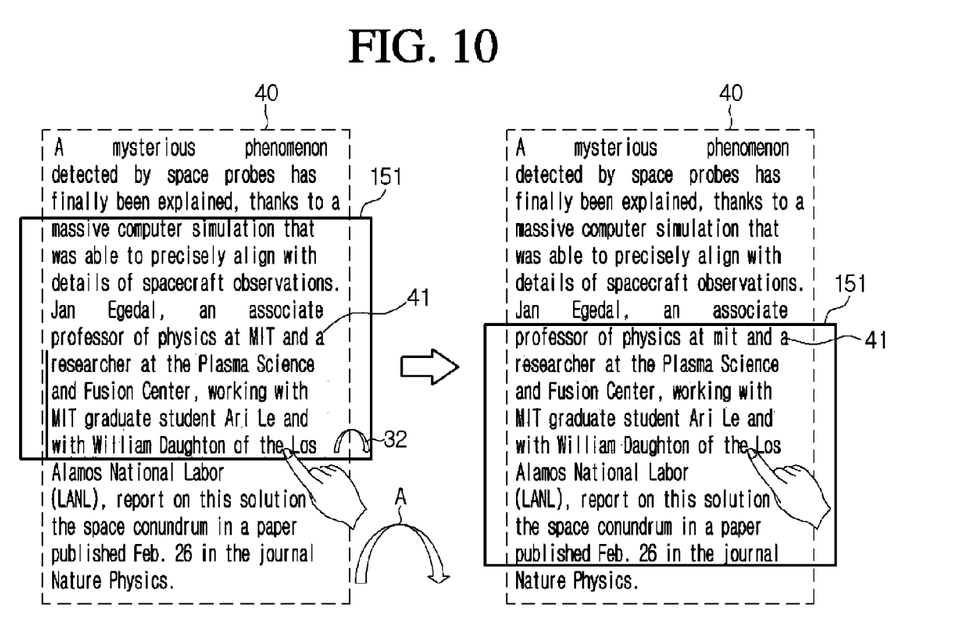

Next, FIG. 10 shows how the position of text moves through the tilting of a mobile terminal according to an embodiment, when the object is the text.

FIG. 10 shows the entire text 40 and text that is displayed on the display unit 151 of the mobile terminal 100 among the entire text. Some text 41 which a user wants to select among the text displayed on the display unit 151 may be selected through a user's touch or dragging. In and embodiment, when a touch to the some text 41 selected is maintained for a certain time, the operating mode of the mobile terminal 100 may operate in a tilting object moving mode. In this case, the tilting gesture UI indicating that the mobile terminal 100 operates in the tilting object moving mode 32 may be displayed on a certain region of the display unit 151.

Then, when the tilting gesture of the mobile terminal 100 is performed in A direction by a user, the position of text that the display unit 151 displays among the entire text 40 may move in a lower direction. In this case, the some text 41 selected by the user may be displayed on the upper portion of the display unit 151. That is, when the tilting gesture of the mobile terminal 100 is performed in the A direction by the user, the position of text that the display unit 151 displays among the entire text 40 moves in a lower direction but the position of the some text 41 selected by the user may be fixed and thus displayed on the upper portion of the display unit 151.

Refer back to FIG. 2.

Then, the control unit 180 checks whether a tilting gesture input through the user input has stopped in step S121, and when the tilting gesture input has stopped, the control unit 180 receives a user input for the movement of the selected object at the position of the page moved in step S123, and moves the selected object to a position corresponding to user input reception for the movement of the selected object in step S125.

On the other hand, when in step S113, it is checked that the selected object is not located at the tilting operation region, the control unit 180 maintains the operating mode of the mobile terminal 100 in a touch object moving mode in step S127.

According to various embodiments, the user may adjust the tilting degree of the mobile terminal 100 to easily move the position of an object to a place where the user wants. In particular, when there is a need to move the position of an object to a long page, the user may effectively move the object only with the tilting operation and thus user convenience may be significantly enhanced.

According to an embodiment, the above-described method may also be embodied as processor readable codes on a program-recorded medium. Examples of the processor readable medium are a ROM, a RAM, a CD-ROM, a magnetic tape, a floppy disk, and an optical data storage device, and the method is also implemented in the form of a carrier wave (such as data transmission through the Internet).

The above-described mobile terminal is not limited to the configuration and method of the above-described embodiments, and some or all of the embodiments may also be selectively combined so that various variations may be implemented.

The invention claimed is:

1. An operating method of a mobile terminal, the operating method comprising:
   displaying, on a display unit, an object list;
   receiving a selection of a specific object in the displayed object list;
   checking whether the selected specific object is located in a certain region of a screen of the display unit;
   changing an operating mode of the mobile terminal from a touch object moving mode for moving the selected specific object according to a movement of a touch input to a tilting object moving mode for moving the selected specific object according to a tilting of the mobile terminal if the selected specific object is located in the certain region;
   receiving an input of a tilting gesture for moving a position of the selected specific object; and
   moving the position of the selected specific object according to the tilting gesture.

2. The operating method according to claim 1, wherein the moving of the position of the selected specific object further comprises moving a page position of the object list displayed on the display unit according to the tilting gesture.

3. The operating method according to claim 2, wherein the moving of the position of the selected specific object further comprises changing a speed at which the position of the selected specific object moves, according to the tilting degree of the mobile terminal according to the tilting gesture.

4. The operating method according to claim 1, further comprising enabling the operating mode of the mobile terminal to enter the tilting object moving mode when a touch to the specific object is maintained for a certain time.

5. The operating method according to claim 4, further comprising displaying a tilting gesture UI when the operating mode of the mobile terminal enters the tilting object moving mode.

6. The operating method according to claim 1, further comprising displaying a tilting gesture UI when the operating mode of the mobile terminal enters the tilting object moving mode.

7. The operating method according to claim 1, wherein the moving of the position of the selected specific object according to the tilting gesture comprises moving the position of the selected specific object in a direction in which the mobile terminal is tilted according to the tilting gesture.

8. A mobile terminal comprising:
   a display unit;
   a gyro sensor configured to detect a tilting of the mobile terminal; and
   a control unit configured to control the display unit and the gyro sensor,
   wherein the control unit is further configured to:
   display an object list on the display unit,
   receive a selection of a specific object in the displayed object list,
   check whether the selected specific object is located in a certain region of a screen of the display unit,
   change an operating mode of the mobile terminal from a touch object moving mode for moving the selected specific object according to a movement of a touch input to a tilting object moving mode for moving the selected specific object according to the tilting of the mobile terminal if the selected specific object is located in the certain region,
   receive an input of a tilting gesture for moving a position of the selected specific object, and
   move a position of the selected specific object according to the tilting gesture.

9. The mobile terminal according to claim 8, wherein the control unit further moves a page position of the object list displayed on the display unit according to the tilting gesture.

10. The mobile terminal according to claim 9, wherein the control unit changes a speed at which the position of the selected specific object moves, according to the tilting degree of the mobile terminal according to the tilting gesture.

11. The mobile terminal according to claim 8, wherein the control unit enables the operating mode of the mobile terminal to enter the tilting object moving mode when a touch to the specific object is maintained for a certain time.

12. The mobile terminal according to claim 8, wherein the control unit moves the position of the selected specific object in a direction in which the mobile terminal is tilted according to the tilting gesture.

\* \* \* \* \*